US010360258B2

(12) United States Patent
Cheung et al.

(10) Patent No.: US 10,360,258 B2
(45) Date of Patent: *Jul. 23, 2019

(54) IMAGE ANNOTATION USING AGGREGATED PAGE INFORMATION FROM ACTIVE AND INACTIVE INDICES

(71) Applicant: Microsoft Technology Licensing, LLC, Redmond, WA (US)

(72) Inventors: Pak-Ming Cheung, Sammamish, WA (US); Bo Geng, Sammamish, WA (US); Xin Yu, Bellevue, WA (US); Arun Sacheti, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,221

(22) Filed: Jun. 9, 2017

(65) Prior Publication Data

US 2017/0277721 A1    Sep. 28, 2017

Related U.S. Application Data

(63) Continuation of application No. 14/562,232, filed on Dec. 5, 2014, now Pat. No. 9,697,236.

(51) Int. Cl.
*G06F 16/58* (2019.01)
*G06F 17/24* (2006.01)
*G06F 16/958* (2019.01)

(52) U.S. Cl.
CPC ........ *G06F 16/5866* (2019.01); *G06F 16/958* (2019.01); *G06F 17/241* (2013.01)

(58) Field of Classification Search
USPC .......................................................... 706/12
See application file for complete search history.

(56) References Cited

U.S. PATENT DOCUMENTS

| 8,204,842 | B1 | 6/2012 | Zhang et al. |
| 8,219,511 | B2 | 7/2012 | Yang |
| 8,560,517 | B2 | 10/2013 | Yang |
| 8,571,850 | B2 | 10/2013 | Li et al. |
| 8,903,166 | B2 | 12/2014 | Yang |
| 8,983,995 | B2 | 3/2015 | Hsu |
| 9,070,046 | B2 * | 6/2015 | Geng .................. G06F 16/951 |

(Continued)

OTHER PUBLICATIONS

Zhou, et al., "Leveraging Auxiliary Text Terms for Automatic Image Annotation", In Proceedings of the 20th international conference companion on World wide web, Mar. 28, 2011, 2 pages.

(Continued)

*Primary Examiner* — Michael B Holmes
(74) *Attorney, Agent, or Firm* — Jeffrey L. Ranck; Ranck IP Law (57) ABSTRACT

Architecture that addresses page information lost as part of a selection process in a search engine framework. An aggregation process collects all page or document information from the same image cluster and uses the aggregated page information to annotate one or more selected image-page pairs within the same image cluster. Once the entire set of descriptive terms is received, the entire set of descriptive terms or only an optimum set of top N descriptive terms of the entire set is for annotation of one or more of the representative images in the cluster.

20 Claims, 9 Drawing Sheets

(56) References Cited

U.S. PATENT DOCUMENTS

| | | | | |
|---|---|---|---|---|
| 9,251,284 | B2* | 2/2016 | Van Velzen | H04L 65/605 |
| 9,697,236 | B2* | 7/2017 | Cheung | G06F 16/5866 |
| 10,061,866 | B2* | 8/2018 | Vaidya | G06F 16/90324 |
| 10,162,865 | B2* | 12/2018 | Yuen | G06F 17/30265 |
| 2005/0256867 | A1 | 11/2005 | Walther et al. | |
| 2014/0105488 | A1 | 4/2014 | Geng et al. | |
| 2016/0150038 | A1* | 5/2016 | Sacheti | H04L 67/22 709/224 |
| 2018/0137660 | A1* | 5/2018 | De Abreu Rodriguez | G06T 11/60 |
| 2018/0239824 | A1* | 8/2018 | D'Souza | G06F 11/302 |
| 2018/0373719 | A1* | 12/2018 | Valliani | G06F 16/24578 |

OTHER PUBLICATIONS

Yang, et al., "Mining multi-tag association for image tagging", In Journal of World Wide Web, vol. 14 Issue 2, Mar. 1, 2011, 24 pages.

Wang, et al., "Arista—image search to annotation on billions of web photos", In IEEE Conference on Computer Vision and Pattern Recognition, Jun. 13, 2010. 12 pages.

Wang, et al., "Duplicate Discovery on 2 Billion Internet Images", In IEEE Conference on Computer Vision and Pattern Recognition Workshops, Jun. 23, 2013, 8 pages.

Carmel, et al., "Enhancing cluster labeling using wikipedia", In Proceedings of the 32nd international ACM SIGIR conference on Research and development in information retrieval, Jul. 19, 2009, 8 pages.

Yang, et al., "Semi-supervised Multimodal Clustering Algorithm Integrating Label Signals for Social Event Detection", 2015 IEEE International Conference on Multimedia Big Data, pp. 32-39. DOI: 10.1109/BigMM.2015.26 IEEE Conference Publications.

Raftopoulos, et al. "Mining User Queries with Markov Chains: Application to Online Image Retrieval", IEEE Transactions on Knowledge and Data Engineering, vol. 25, No. 2, Feb. 2013. pp. 433-447. DOI: 10.1109/TKDE.2011.219 IEEE Journals & Magazines.

Kim, et al., "Modality-Invariant Image Classification Based on Modality Uniqueness and Dictionary Learning", IEEE Transactions on Image Processing, vol. 26 No. 2, Feb. 2017. pp. 884-899. DOI: 10.1109/TIP.2016.2635444 IEEE Journals & Magazines.

Zhen, et al. "Improved Cluster Center Adaption for Image Classification", Image Processing (ICIP), 2015 IEEE International Conference on, Date of Conference: Sep. 27-30, 2015. pp. 3092-3095 ICIP 2015. DOI:10.1109/ICIP.2015.7351372 IEEE Conference Publications.

* cited by examiner

IMAGE ANNOTATION USING AGGREGATED PAGE INFORMATION FROM ACTIVE AND INACTIVE INDICES

BENEFIT OF EARLIER FILED APPLICATION

This application claims the benefit of earlier filed patent application Ser. No. 14/562,232 entitled "Image Annotation Using Aggregated Page Information from Active and Inactive Indices," filed Dec. 5, 2014.

BACKGROUND

With the never-ending explosion of images on the web, only a small portion of the enormous number of image-page pairs on a search engine can be served because of the capacity limitation on storage and networking. There are many of the same images that can appear in multiple different webpages. For example, Wikipedia™ has been translated into different language pages, which usually contain the same images with descriptive text in different languages. In another example, the same photos of many celebrities usually appear in different news articles (and possibly in the same language or in different languages). Similarly, there are even more similar images (but not necessarily the exact same image) that can appear in multiple different pages as well. The search engine can utilize an image-page pair selection process that selects the "best" image-page pairs on the web. However, this means that possibly many image-page pairs may be lost or not utilized.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture addresses page information lost as part of a selection process in a search engine framework. In support thereof, an aggregation process of all page or document information (e.g., HTML (hypertext markup language) body text, page title, Alt attribute, etc., of an HTML page) from the same image cluster. The aggregated page information is used to annotate one or more selected image-page pairs within the same image cluster.

Once the entire set of descriptive terms are received and aggregated, the entire set of descriptive terms can be utilized in the annotation process, or alternatively, in order to mitigate the increase in size of large search indexes, only an optimum set of the top N descriptive terms for different image-page pairs are selected from the aggregated page information for annotation. There can be a different "N" for different image-page pairs, and for images within the same image cluster or from different image clusters. In either case, this improves the quality of the image search results, while maintaining a manageable image index. Thus, the search engine framework realizes at least the technical effects of improved resource utilization and reduced network bandwidth usage.

Additionally, ranker relevance is improved by aggregating page information from similar images, as well as same image, in the image cluster. The usefulness of the page information from different parts of the page is deemed to be of different value; hence, the term weightings can be different. For example, the page title is typically considered to be more descriptive than body text. Furthermore, terms within the body text are considered of varying importance. Additionally, terms that are closer in proximity to the embedded image in the page are considered to be more useful. As a result, annotating the selected image(s) with a multiple carefully-picked terms is beneficial at least to the extent of increasing the ranking relevance, without excessively increasing the size of the index.

As a general operational description, for all image-page pairs that have been crawled, the architecture can then cluster the images, and hence, image tuples, based on image similarity using one or more commonly-known clustering algorithms. Each of these clusters is then referred to as an image cluster. Within each image cluster, all the associated page information (e.g., if an HTML-type webpage, the body text, page title, Alt attribute, etc. of the HTML-type page) is then collected (aggregated).

A statistical model is then trained and used to assign different weights to the aggregated terms based on term criteria such as the location of the terms from different parts of the page, etc. For example, intuitively, terms in the page title can receive a higher weighting than terms from the body text. Thus, based on the statistical model, weights are assigned to all the terms in the aggregated page information.

Term duplication can be resolved. For example, if a term appears multiple times in the aggregation, the different weights can be summed together. A string-based feature selection method (e.g., Mutual Information score, TF-IDF (term frequency-inverse document frequency), etc.) can be utilized to select the N terms with highest score. Intuitively, the selected terms are those terms assigned with highest weightings. However, when a term is assigned with a highest weighting in different image clusters, that term may be deemed meaningless for further to consideration (a so-called "stop word"). In many feature selection methods (e.g., Mutual Information score), stop words are penalized from receiving a higher score.

Some or all of the selected terms can then be used to annotate the selected image-page pairs within the same image cluster. Additionally, the entire system can be tested to select the optimum set of N terms, where N is an integer. There can be a different "N" values for different image-page pairs, which also applies to image-page pairs within the same cluster and/or from different clusters. This is because there can be a tradeoff between system performance and the ranking relevance, or other comparative operations that can be optimized based on term selection.

More generally, the architecture can include a system, comprising: an aggregation component configured to aggregate all page information of an image cluster into aggregated page information, the image cluster created based on image similarity of images in the image cluster; a selection component configured to select descriptive terms from the aggregated page information to represent the image cluster; an annotation component configured to annotate selected image-page tuples of the image cluster with the descriptive terms; and, at least one hardware processor configured to execute computer-executable instructions in a memory associated with the aggregation component, the selection component, and the annotation component. The aggregation component, the selection component, and the annotation component enable improved system performance, reduced network bandwidth usage, and improved ranking relevance.

The system can further comprise an indexing component configured to index the selected image-page tuples annotated with one or more of the descriptive terms, a training component configured to train a model that is employed to assign weights to the descriptive terms of pages associated with the page information, and a testing component configured to compute an optimum system operating state that is a compromise between system performance and ranking relevance performance, the optimum operating state obtained by selection of an optimum operating set of the descriptive terms.

The architecture can include a method, comprising acts of: clustering images into an image cluster based on image similarity of images, the images associated with pages of page information; aggregating all the page information of the image cluster into aggregated page information; selecting descriptive terms from the aggregated page information to represent the image cluster; annotating selected image-page tuples of the image cluster with the descriptive terms; and indexing the selected image-page tuples based on the descriptive terms. The acts of clustering, aggregating, selecting, annotating, and indexing improve system performance, reduce network bandwidth usage, and improve ranking relevance.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

In an existing selection process, a statistical model is trained to predict the likelihood of receiving future user clicks (selections) on an image-page pair (more generally, an image-page "tuple"). If the likelihood is above a specified threshold or in accordance to some criteria, the image-page pair is considered to be more likely to be selected (clicked) by a user in the future. A selected image-page pair can be served in an active index (being currently used) and the associated descriptive information on the corresponding page (of the image-page pair) can be used in image search ranking. On the other hand, image-page pairs dropped from the index selection process (for the active index) may not be used in the image search process. The unused image-page pairs are described herein as being associated with an inactive index (or collection not used in the search process).

Currently, the image index process clusters all images based on a similarity metric to each other, and retains one, two, or more image-page pairs for each selected image cluster, as representative of the image cluster. Hence, all potentially useful page information from other image-page pairs within the image cluster is discarded. This discard page information can be useful for annotating the image, and thus, provide additional benefit to at least the image search ranking.

As a general operational description, for all image-page pairs that have been crawled, the disclosed architecture can then cluster the images, and hence, image tuples, based on image similarity using one or more commonly-known clustering algorithms. Each of these clusters is then referred to as an image cluster. Within each image cluster, all the associated page information (e.g., if an HTML-type webpage, the body text, page title, Alt attribute, etc. of the HTML-type page) is then collected (aggregated).

A statistical model is then trained and used to assign different weights to the aggregated terms based on term criteria such as the location of the terms from different parts of the page, etc. For example, intuitively, terms in the page title can receive a higher weighting than terms from the body text. Thus, based on the statistical model, weights are assigned to all the terms in the aggregated page information.

Term duplication can be resolved. For example, if a term appears multiple times in the aggregation, the different weights can be summed together. It is to be understood that aggregation functions other than "sum" can be employed, for example, "max" (the maximum value), "average" (the average of the values), etc. A string-based feature selection method (e.g., Mutual Information score, TF-IDF (term frequency-inverse document frequency), etc.) can be utilized to select the N terms with highest score. There can be a different "N" values for different image-page pairs, which also applies to image-page pairs within the same cluster and/or from different clusters. Intuitively, the selected terms are those terms assigned with highest weightings. However, when a term is assigned with a highest weighting in many different image clusters, that term may be deemed meaningless for further to consideration (a so-called "stop word"). In many feature selection methods (e.g., Mutual Information score), stop words are penalized from receiving a higher score.

Some or all of the selected terms can then be used to annotate the selected image-page pairs within the same image cluster. Note that where the term contains only one word (also referred to as a unigram) or more than one word (also referred to as an n-gram, with n>1, and where small "n" is not equivalent in meaning to big "N" used in the context of term selection), the algorithm can work on both types of terms (unigrams and n-grams). Additionally, the entire system can be tested to select the optimum set of N terms. This is because there can be a tradeoff between system performance and the ranking relevance, or other comparative operations that can be optimized based on term selection.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
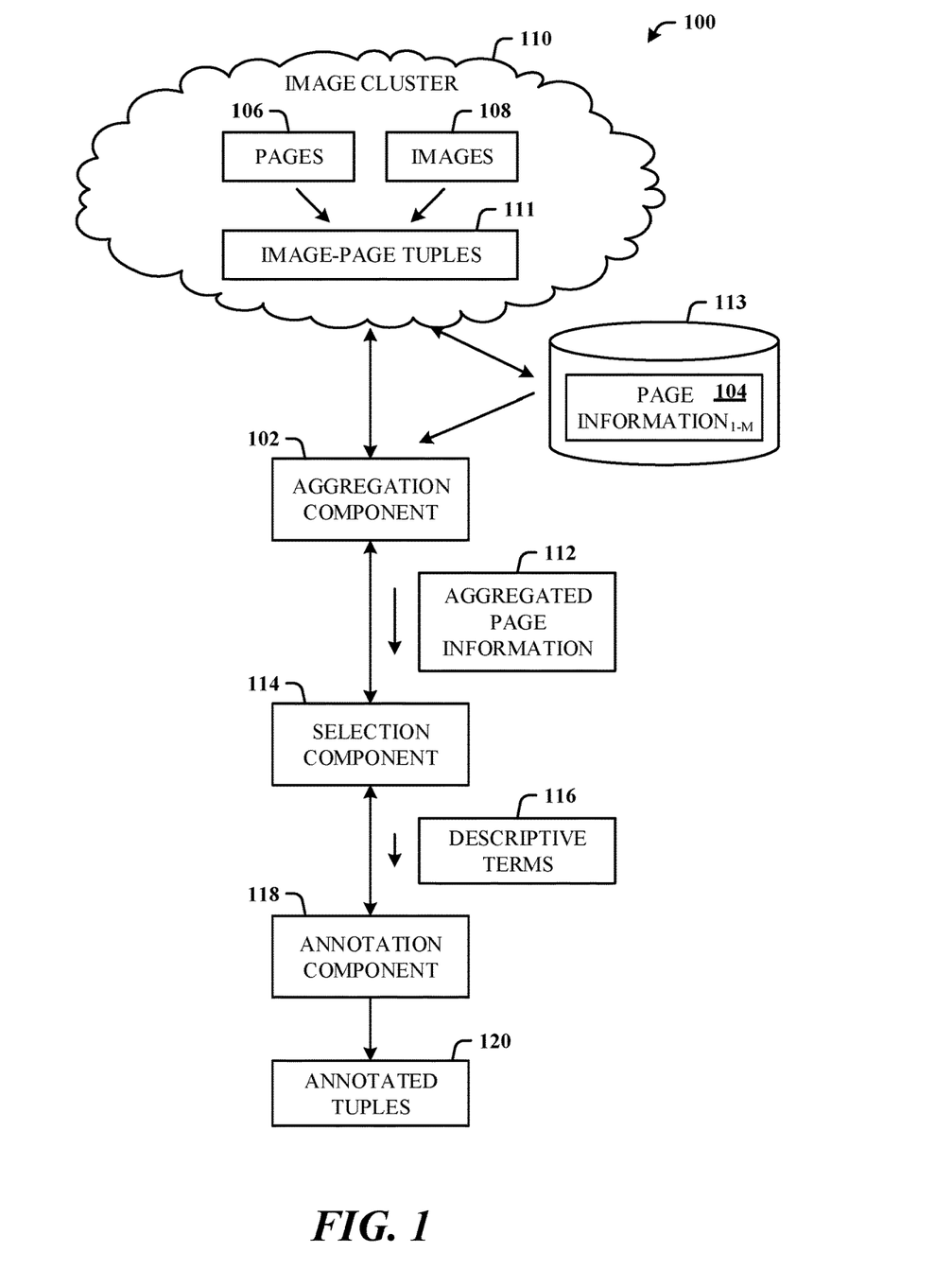
FIG. 1 illustrates an annotation system in accordance with the disclosed architecture.

FIG. 1 illustrates an annotation system 100 in accordance with the disclosed architecture. The system 100 can include an aggregation component 102 configured to aggregate all page information 104 of pages 106 associated images 108 in an image cluster 110 into aggregated page information 112. The page information 104 can be stored for fast access in a store 113, such as chip memory, database, or any other suitable store that provided the desired storage and access capabilities.

The image cluster 110 can be created based on image similarity of the images 108, as utilized to create the image cluster 110. Given that the images 108 are related to webpages (e.g., the pages 106) or other types of documents from which the images are extracted, there exist image-page tuples 111. Additionally, image-page tuple relationships (e.g., pairs) can include the following: a single image to a single page, a single image to multiple pages, a single page to multiple images, and multiple pages to multiple images. The images and pages can each be identified with an identifier (e.g., alphanumeric tag) distinguishes each image and each page from other images and pages.

The image cluster 110 is created as one of many possible clusters of images from a collection of images selected for clustering (or classification) using any one or more commonly-known clustering (or classification) algorithms or optimization methods (components). In other words, the images 108 are clustered together such that the images 108 in the cluster 110 are more alike, based on some criteria (e.g., distance function, density threshold, etc.), than images not in the cluster 110 (e.g., a different cluster). The image cluster 110 can be one of many image clusters each having pages and images that can further be identified as having relationships as image-page pairs. Additionally, page information can be identified and aggregated for each clusters, and the page information can be the same or similar as the page information 104, for example. Thus, the clustering algorithm can also be configured to define the image-page tuples 111, extract the page information 104 for each page, and then expose the page information 104 to the aggregation component 102. Thus, the system 100 can operate on many different clusters already provided by a clustering framework (not shown, but, e.g., for image analysis, information retrieval, etc.).

The pages 106 can be documents (e.g., webpages) in which the images 108 have an association. Thus, a page is highly likely to have text or other media content associated with the corresponding image or images, where the text or other media content are in some way descriptive of the image or images in the document. For example, a webpage can be an HTML (hypertext markup language) document or version thereof (e.g., XHTML—extensible HTML) that contains body text, a page title, audio clips, video clips, Alt attribute (for alternative text), media title, section title, caption of the image, attribute, etc., of an HTML page. In non-webpage-type documents, such as word processing documents, spreadsheet documents, etc., page information can include, but is not limited to, filename, document title, document section titles, table of contents text, text in proximity to an embedded image, and so on.

A selection component 114 is provided and configured to select descriptive terms 116 from the aggregated page information 112, which descriptive terms 116 are then used to represent the image cluster 110. The selection component can be configured to select the same sets or different sets of descriptive terms for different image-page tuples of the image cluster. Additionally, if a term is already present in the selected image-page pair, the system may opt to omit that term from the annotated stream for that image-page pair. Since different image-page pairs within the image cluster can have different terms in its page information, the resultant annotated terms for these image-page pairs can also be different.

At this point, the purpose is to extract as many descriptive terms as possible, in accordance with some term selection criteria. For example, the term selection criteria can define the terms that normally would not be indexed, and the terms that normally would be indexed.

The selection component 114 can be configured to select top weighted descriptive terms of the aggregated page information 112 as the descriptive terms 116. The selection component 114 can be any commonly known algorithm that selects items based on selection criteria. The selection component 114 can also be configured to select an optimum set of the descriptive terms 116 based on system performance tradeoffs.

The selection component 114 can comprise a feature selection algorithm configured to select a set of terms having highest scores. Accordingly, the technical effects include at least increased speed and reduce network bandwidth usage for improved user efficiency and search experience.

Once a collection of the descriptive terms 116 is obtained, other processes can be employed to weight and filter the descriptive terms 116 for other purposes, such as relevance.

An annotation component 118 can be provided and configured to annotate selected image-page tuples of the image cluster 110 with some or all of the descriptive terms 116, to produce annotated tuples 120. In one implementation, the image-page tuples are annotated with a lesser set that is less than all (a complete set) of the descriptive terms 116. The computation of this lesser set can be obtained using any algorithms suitable for the intended purpose, such as for relevance of the descriptive terms to the image, location of the descriptive terms on the page, etc. Moreover, annotation need not be performed on all image-pair tuples of the cluster 110, but only on selected image-pair tuples.

Figure 2:
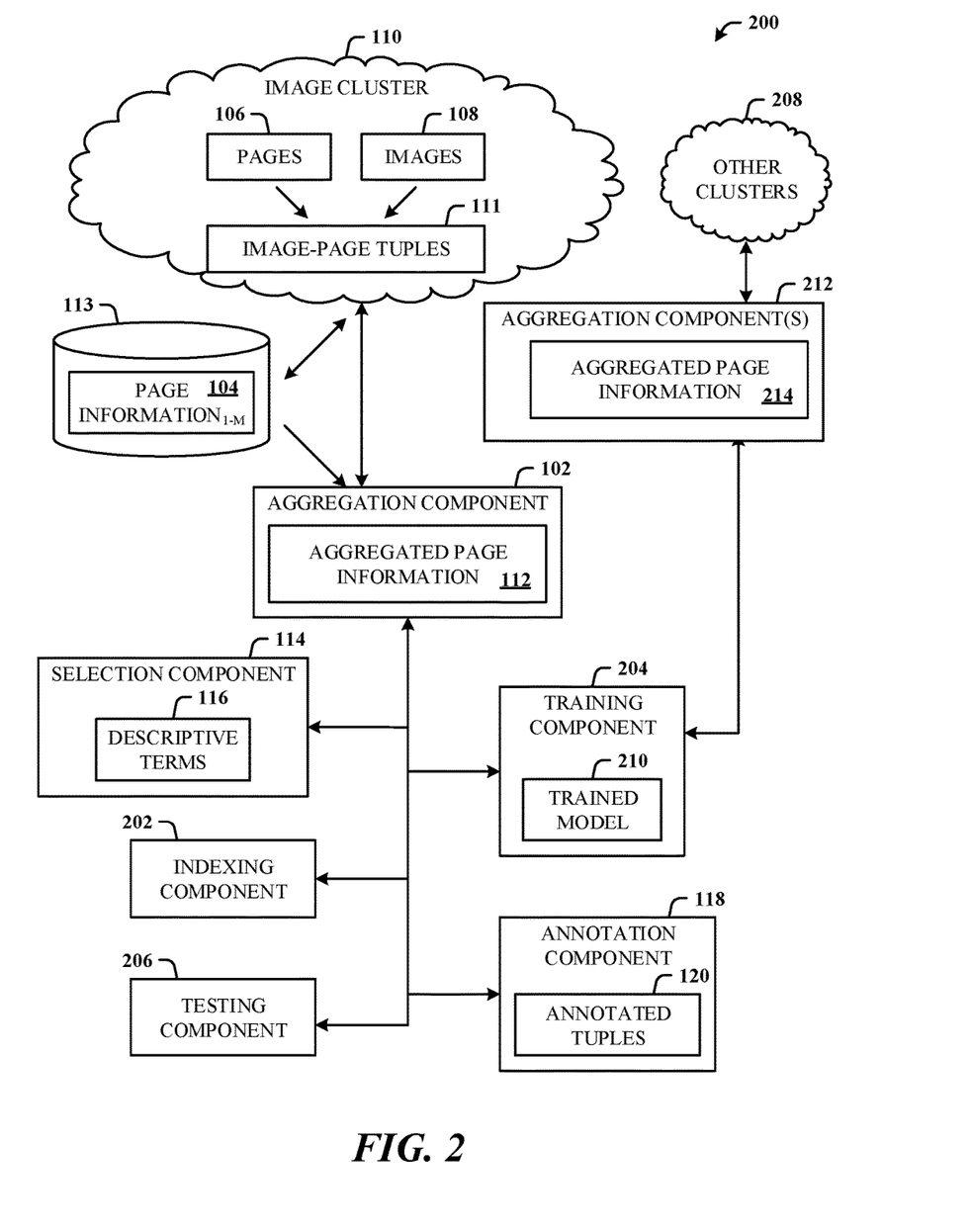
FIG. 2 illustrates an alternative annotation system in accordance with the disclosed architecture.

FIG. 2 illustrates an alternative annotation system 200 in accordance with the disclosed architecture. The system 200 includes the components and functionality of the system 100, as described herein. Additionally, system 200 further comprises an indexing component 202, a training component 204, and a testing component 206.

In this implementation, the selection component 114 is configured to interface to the aggregation component 102, and via which the descriptive terms 116 are selected. At this point, the purpose is to extract as many descriptive terms 116 as possible, in accordance with some term selection criteria. For example, the term selection criteria can define the terms that normally would not be indexed, and the terms that normally would be indexed.

The training component 204 can be configured to train a model (e.g., the trained model 210) that is employed to assign weights to the descriptive terms 116 of pages associated with the page information 104. The trained model 210 can be a statistical model configured to assign different weights to terms obtained from different location of the page. For example, where the page is an HTML webpage, a term found in the page title can receive a higher weighting than a term from the body text of the HTML webpage. Additionally, the training component 204 can be configured to resolve term duplication weighting and cross-cluster term weighting. The training component 204 can also be used to pick the optimum string-based feature selection method (e.g., Mutual Information score, TF-IDF score, etc.).

The selection component 114 can employ the trained model 210 developed using the training component 204. The trained model 210 can be trained using the cluster 110 and other clusters 208, and then used in term selection for the single cluster 110 and/or other clusters 208.

The selection component 114 can be configured to select top weighted descriptive terms of the cluster 110 as the descriptive terms 116. The selection component 114 can be any commonly known algorithm that selects items based on selection criteria, and can also be configured to select an optimum set of the descriptive terms 116 based on system performance tradeoffs.

The selection component 114 can comprise a feature selection algorithm configured to select a set of terms having highest scores. Accordingly, the technical effects include at least increased speed and reduce network bandwidth usage for improved user efficiency and search experience.

Here, the training component 204 can also be configured to access the other clusters 208, in order to obtain global information from all clusters (cluster 110 and other clusters 208) to determine if a given term is acceptable (e.g., the stop words mentioned above). Access to the other clusters 208 can be via one or more other aggregation component(s) 212 that then generate the aggregated page information 214 of the other clusters 208. Thus, the trained model 210 can be trained from all the aggregated information (112 and 214) of the cluster 110 and the other clusters 208.

Alternatively, each of the other clusters 208 also has a corresponding aggregation component that generates its aggregated page information, which is then accessed by the training component 204 to generate the trained model 210.

The indexing component 202 is configured to index the selected image-page tuples annotated with one or more of the descriptive terms 116. A search performed on the index of annotated tuples 120 can then be by way of one or more the descriptive terms 116.

The testing component 206 can be provided and configured to compute an optimum system operating state that is a compromise between system performance and ranking relevance performance. The optimum operating state is obtained by selection of an optimum operating set of the descriptive terms. This optimum operating set can then be used to annotate one or more of the image-page tuples of the image cluster 110.

The systems (100 and 200), by way of one or more of the components, exhibit technical effects in furtherance of computerized implementations. For example, the systems (100 and 200) enable improved system performance in search architectures by reducing network bandwidth usage, improved ranking relevance, and improved user search efficiency and interaction performance via the user interface.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service.

Figure 3:
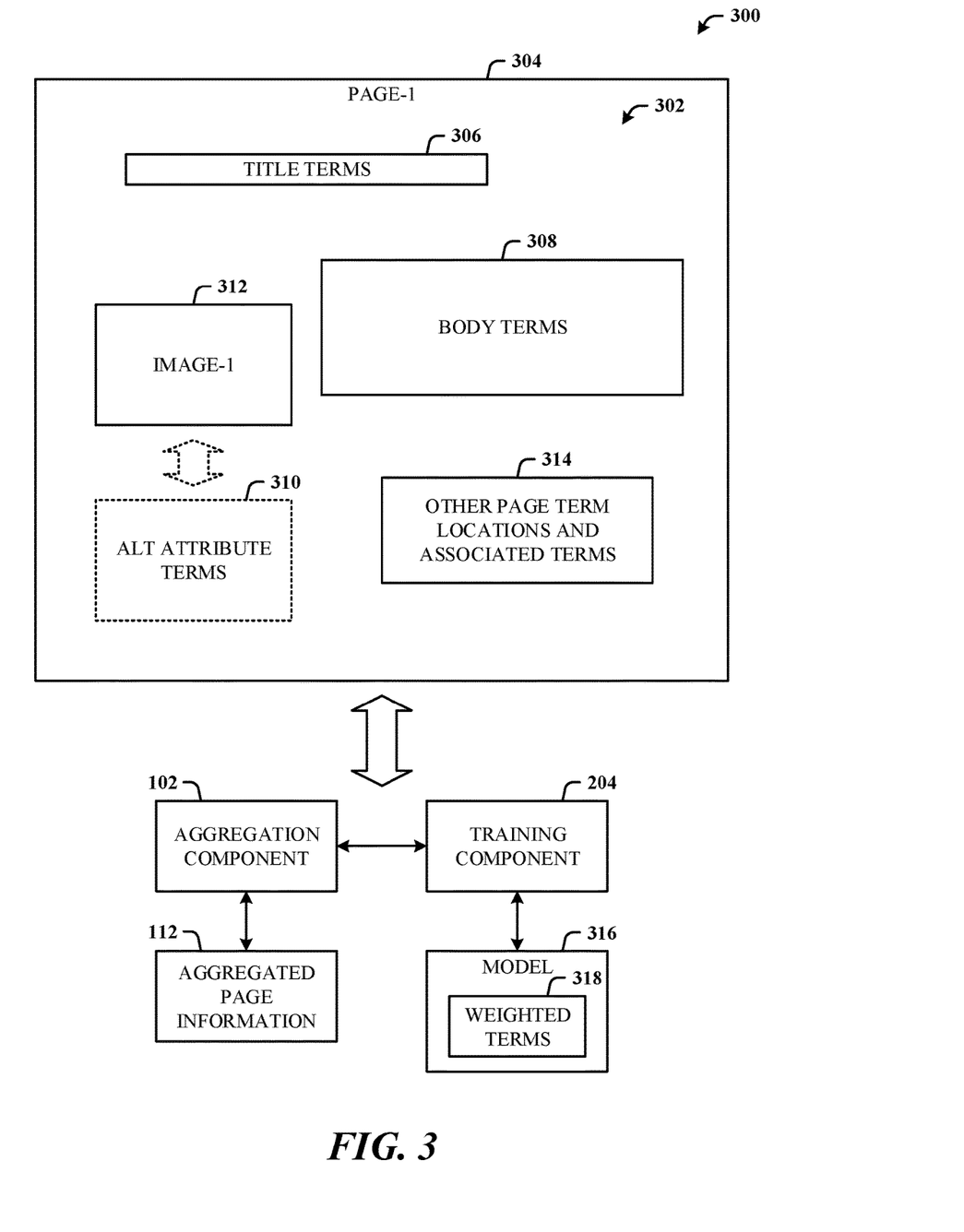
FIG. 3 illustrates a more detailed system of model training and weighting of page terms of a page.

FIG. 3 illustrates a more detailed system 300 of model training and weighting of page terms 302 of a page 304. The page 304 is one of many of the pages 106 that comprise the terms 302 extracted and aggregated by the aggregation component 102. Along with aggregation of all terms of the pages 106, is included the location of the terms in the page 304. For example, the page 304 can comprise title terms 306, body terms 308, Alt attribute terms 310 (presented when the image 312 is not presented), and other page term locations having associated terms 314.

Once the aggregated page information 112 (e.g., comprising the terms 302) is obtained, the training component 204 generates a model 316 (similar to trained model 210) of weighted terms 318. The model 316 can be a statistical model that assigns different weight to terms from different parts of the page. Intuitively, for example, terms found in the page title can be assigned a higher weight, compared to a term from the body text.

Figure 4:
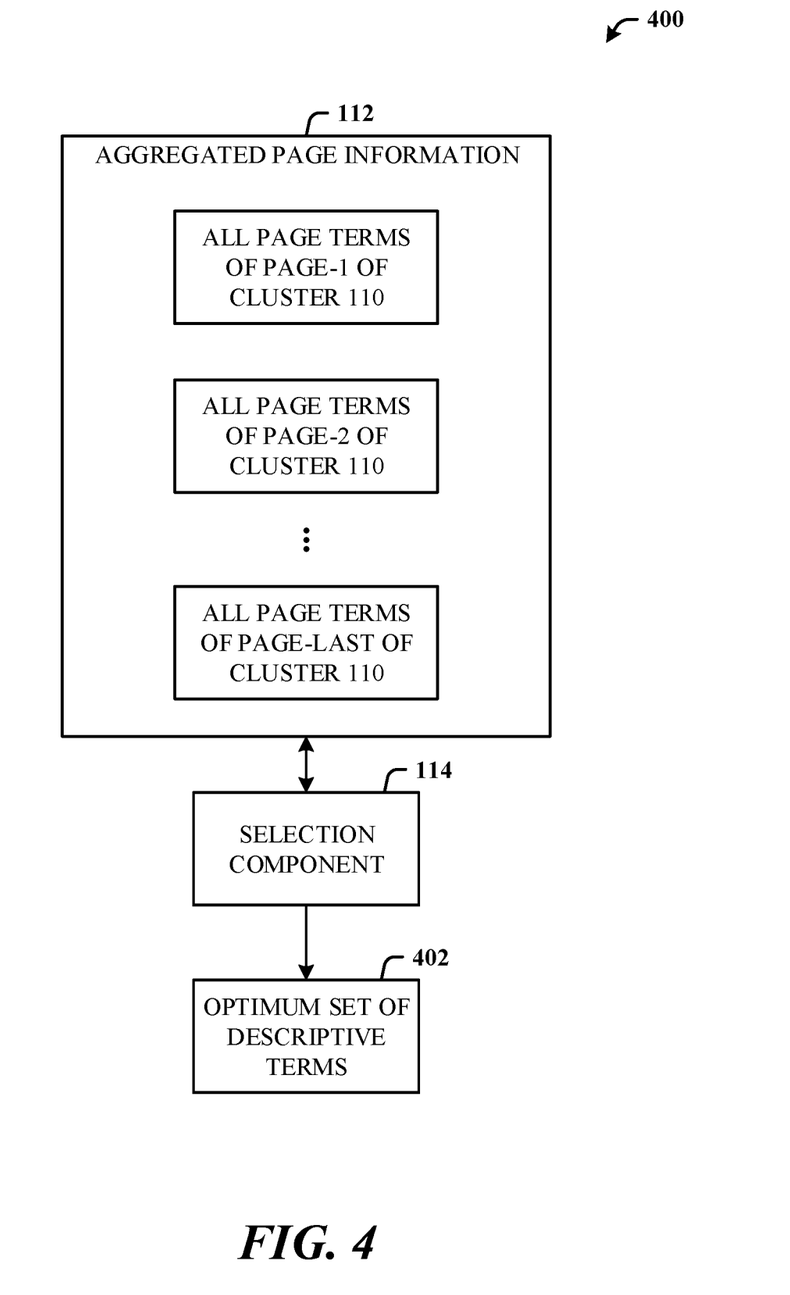
FIG. 4 illustrates a system that selects an optimum set of descriptive terms 402 from the aggregated descriptive information to annotate the image-page tuples.

FIG. 4 illustrates a system 400 that selects an optimum set of descriptive terms 402 from the aggregated descriptive information 112 to annotate the image-page tuples 111. The aggregated descriptive information 112 comprises all page terms of a first page (Page-1) of the cluster 110, all page terms of a second page (Page-2) of the cluster 110, up to an including all page terms of a last page (Page-Last) of the cluster 110. In other words, there are no page terms that are discarded and not considered in the selection and annotation processes. Accordingly, all page terms of the aggregated page information 112 are then processed by the selection component 114 to derive the optimum set of descriptive terms for annotation of the image page tuples 111. As described herein, the selection process by the selection component 114 can further involve other algorithms and processes such for weighting, resolving term duplication, and cross-cluster issues, system testing, and modeling, for example.

Figure 5:
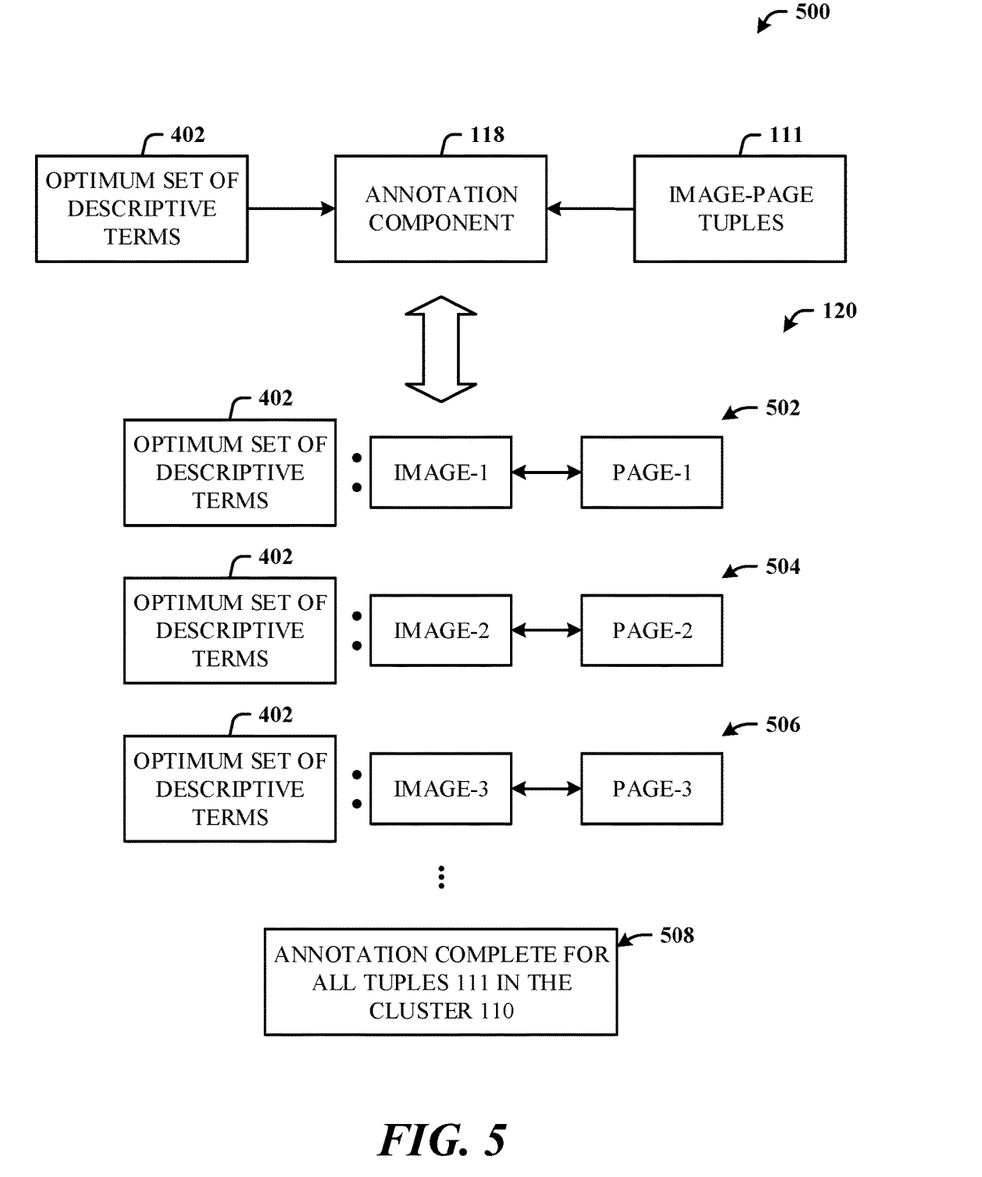
FIG. 5 illustrates a system of annotation of the image-page tuples with the optimum set of descriptive terms.

FIG. 5 illustrates a system 500 of annotation of the image-page tuples 111 with the optimum set of descriptive terms 402. The annotation component 118 receives as input both the optimum set of descriptive terms 402 and the image-page tuples 111. The output of the annotation component 118 are the annotated tuples 120, such as a first annotated tuple 502, a second annotated tuple 504, a third annotated tuple 506, to annotation completion for all tuples 111 of the cluster 110, at 508. The annotated tuples can be represented as data in any suitable manner that may be commonly known.

In an alternative implementation, tuple annotation need not include each tuple of the cluster 110, but certain tuples of the entire set of tuples in the cluster 110. Moreover, different optimum sets of descriptive terms 402 can be derived and customized for each tuple or groups of tuples in the cluster 110.

Figure 6:
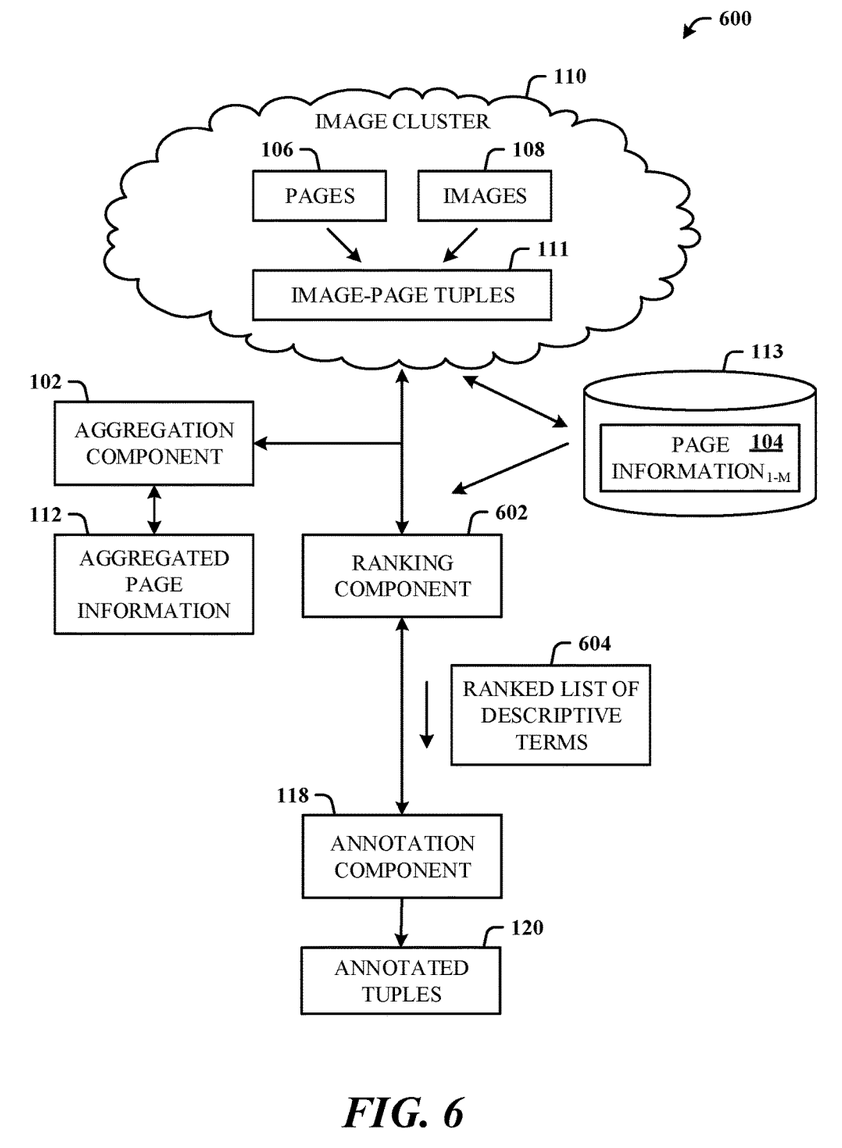
FIG. 6 illustrates an alternative system in accordance with the disclosed architecture.

FIG. 6 illustrates an alternative system 600 in accordance with the disclosed architecture. In this system 600, the selection component 114 can be replaced or augmented with a ranking component 602 that interfaces (e.g., directly, or indirectly through another component) to the cluster 110 to rank terms into a ranked list of descriptive terms 604 (the terms ranked based on relevance to the image cluster 110). The annotation component 118 then receives the ranked list and determines which terms will be annotated.

Using selected terms from the ranked list of descriptive terms 604, the annotation component 118 then annotates tuples to output the annotated tuples 120. It is to be understood that not all of the image-page tuples may be annotated, that those that are can be annotated with the same selected terms. Alternatively, image-page tuples of the cluster 100 can be annotated differently with different sets of the descriptive terms.

As depicted in system 600, either or both of the aggregation component 102 or/and ranking component 602 can be implemented in direct interface to the image cluster 110 and/or the other clusters 208 of FIG. 2. Thus, ranking can be accomplished on one or more of the clusters by the single ranking component 602 or specific ranking components dedicated to each cluster. This same flexibility can be applied to the aggregation component 102 as well. The ranking component 602 can also access the aggregated page information 112 and/or the stored page information 104, as configured to do so.

The disclosed architecture can optionally include a privacy component (not shown) that enables the user to opt in or opt out of exposing personal information related to search. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
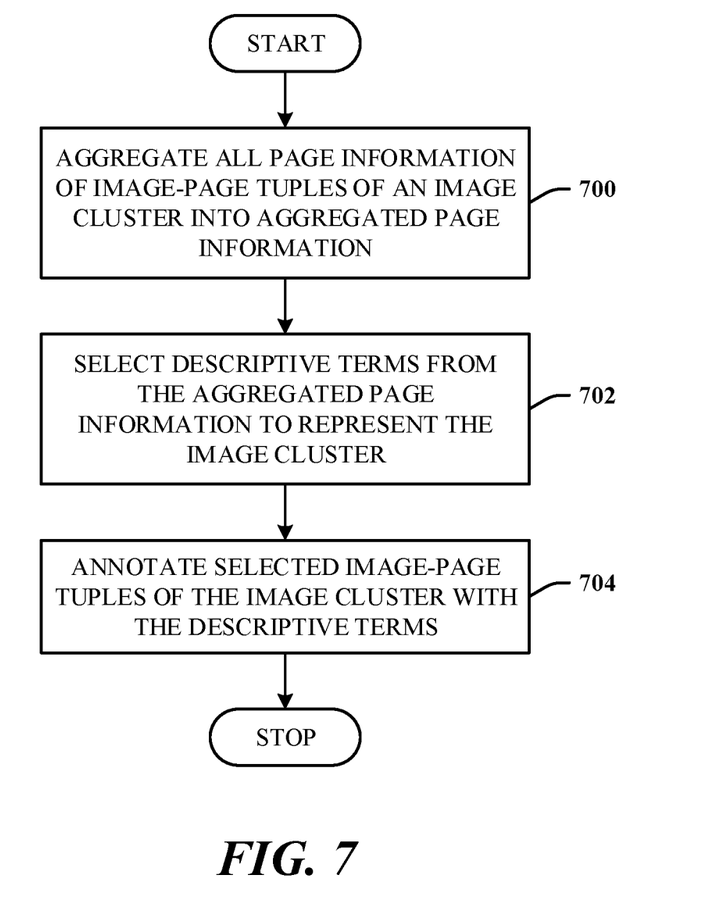
FIG. 7 illustrates a method in accordance with the disclosed architecture.

FIG. 7 illustrates a method in accordance with the disclosed architecture. As preparation for the method, image-page tuples are clustered into an image cluster based on image similarity of images of the image cluster. The images are associated with pages of page information. At 700, all page information of image-page tuples of an image cluster is aggregated into aggregated page information. At 702, descriptive terms are selected from the aggregated page information to represent the image cluster. At 704, selected image-page tuples of the image cluster are annotated with the descriptive terms. The acts of aggregating, selecting, and annotating exhibit a technical effect of improving system performance, reducing network bandwidth usage, and improving ranking relevance.

The method can further comprise indexing the selected image-page tuples. The method can further comprise training a model that is employed to assign weights to the descriptive terms of the pages. The method can further comprise selecting top weighted descriptive terms of the aggregated page information as the descriptive terms.

The method can further comprise selecting an optimum set of the descriptive terms based on system performance tradeoffs. The method can further comprise resolving term duplication and cross-cluster term weighting issues. The method can further comprise selecting a set of terms having highest scores using a feature selection algorithm.

Figure 8:
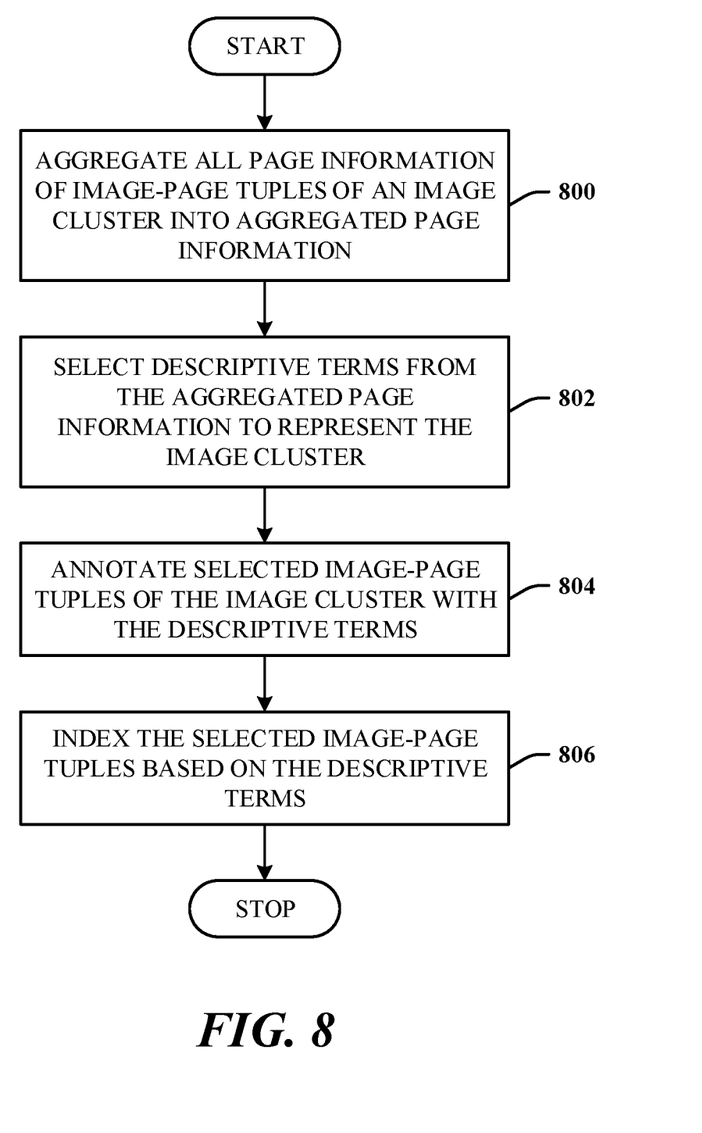
FIG. 8 illustrates an alternative method in accordance with the disclosed architecture.

FIG. 8 illustrates an alternative method in accordance with the disclosed architecture. The method can be implemented as a computer-readable storage medium comprising computer-executable instructions that when executed by a hardware processor, cause the processor to perform the following acts.

As preparation for the method, images are clustered into an image cluster based on image similarity of images of the image cluster. The images associated with pages of page information. At 800, all of the page information of the image cluster is aggregated into aggregated page information. At 802, descriptive terms are selected from the aggregated page information to represent the image cluster. At 804, selected image-page tuples of the image cluster are annotated with the descriptive terms. At 806, the selected image-page tuples are indexed based on the descriptive terms. The acts of aggregating, selecting, annotating, and indexing, improve system performance, reduce network bandwidth usage, and improve ranking relevance.

The method can further comprise training a statistical model that assigns different term weights based on location of the descriptive terms in a page. The method can further comprise selecting top weighted descriptive terms of the aggregated page information as the descriptive terms.

The method can further comprise selecting an optimum set from the top weighted descriptive terms based on system performance tradeoffs. The method can further comprise computing an optimum system operating state based on derivation of an optimum set of the descriptive terms.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
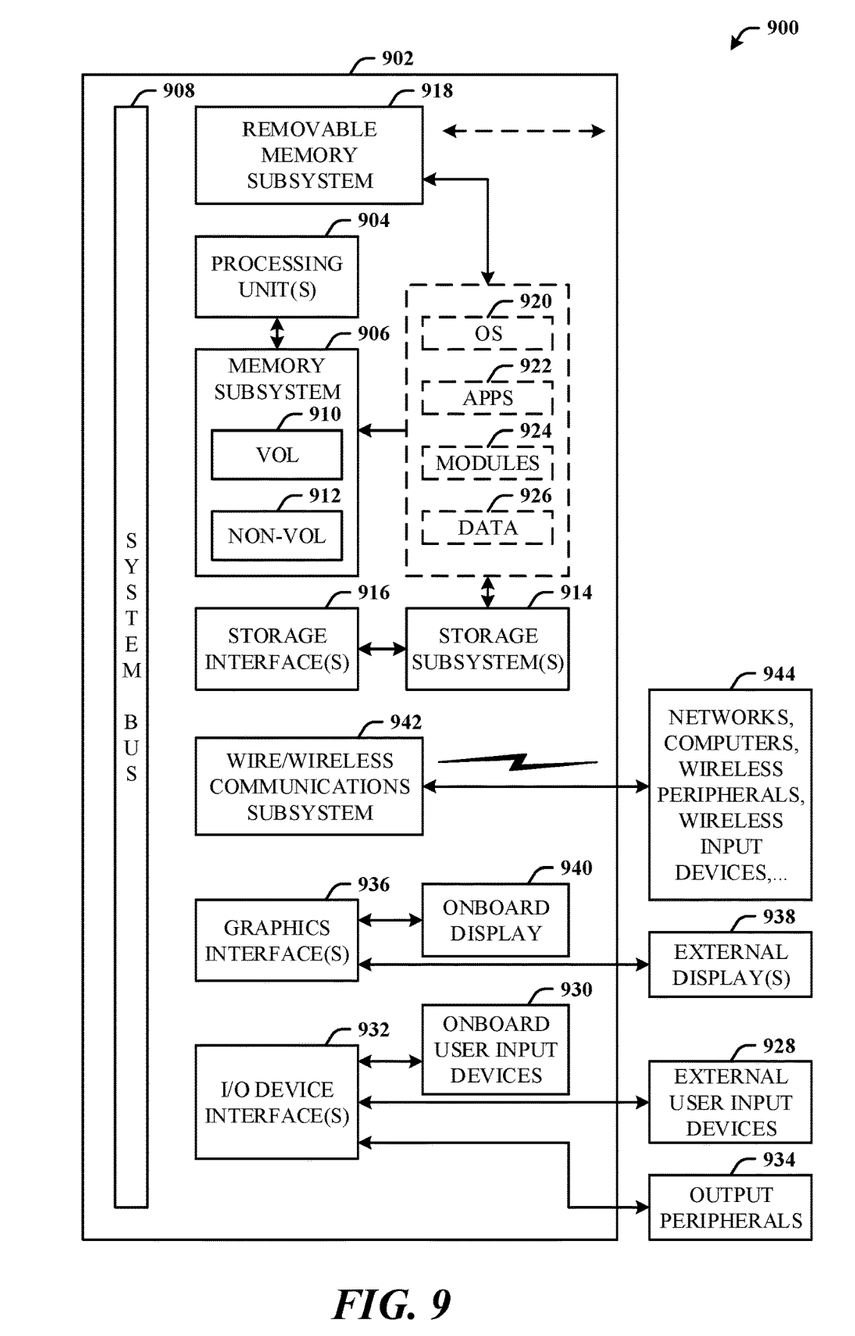
FIG. 9 illustrates a block diagram of a computing system that executes annotation in accordance with the disclosed architecture.

Referring now to FIG. 9, there is illustrated a block diagram of a computing system 900 that executes annotation in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 900 for implementing various aspects includes the computer 902 having microprocessing unit(s) 904 (also referred to as microprocessor(s) and processor(s)), a computer-readable storage medium such as a system memory 906 (computer readable storage medium/media also include magnetic disks, optical disks, solid state drives, external memory systems, and flash memory drives), and a system bus 908. The microprocessing unit(s) 904 can be any of various commercially available microprocessors such as single-processor, multi-processor, single-core units and multi-core units of processing (e.g., central processing units, graphic processing units, etc.) and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 902 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 906 can include computer-readable storage (physical storage) medium such as a volatile (VOL) memory 910 (e.g., random access memory (RAM)) and a non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the microprocessing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components and circuits. The storage subsystem(s) 914 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The operating system 920, one or more application programs 922, other program modules 924, and/or program data 926 can include items and components of the system 100 of FIG. 1, items and components of the system 200 of FIG. 2, items and component of the system 300 of FIG. 3, items and components of the system 400 of FIG. 4, items and components of the system 500 of FIG. 5, items and components of the system 600 of FIG. 6, and the methods represented by the flowcharts of FIGS. 7 and 8, for example.

Generally, programs include routines, methods, data structures, other software components, etc., that perform particular tasks, functions, or implement particular abstract data types. All or portions of the operating system 920, applications 922, modules 924, and/or data 926 can also be cached in memory such as the volatile memory 910 and/or non-volatile memory, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 902, and include volatile and non-volatile internal and/or external media that is removable and/or non-removable. For the computer 902, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 902, programs, and data using external user input devices 928 such as a keyboard and a mouse, as well as by voice commands facilitated by speech recognition. Other external user input devices 928 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 902, programs, and data using onboard user input devices 930 such a touchpad, microphone, keyboard, etc., where the computer 902 is a portable computer, for example.

These and other input devices are connected to the microprocessing unit(s) 904 through input/output (I/O) device interface(s) 932 via the system bus 908, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for aggregating all page information of an image cluster into aggregated page information; means for selecting descriptive terms from the aggregated page information to represent the image cluster; and means for annotating selected image-page tuples of the image cluster with the descriptive terms. The means for aggregating, means for selecting, and means for annotating exhibit the technical effects of improved system performance, reduced network bandwidth usage, and improved ranking relevance.

The system can also comprise means for indexing the selected image-page tuples, means for training a model that is employed to assign weights to the descriptive terms of the pages, and means for selecting top weighted descriptive terms of the aggregated page information as the descriptive terms.

The system can also comprise means for selecting an optimum set of the descriptive terms based on system performance tradeoffs, means for resolving term duplication and cross-cluster term weighting issues, and means for selecting a set of terms having highest scores using a feature selection algorithm.

Alternatively, the disclosed architecture can be implemented as a system, comprising: means for aggregating all page information of an image cluster into aggregated page information; means for selecting descriptive terms from the aggregated page information to represent the image cluster; means for annotating selected image-page tuples of the image cluster with the descriptive terms; and means for indexing the selected image-page tuples based on the descriptive terms. The means for aggregating, means for selecting, means for annotating, and means for indexing exhibit the technical effects of improved system performance, reduced network bandwidth usage, and improved ranking relevance.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising a processor and executable instructions which, when executed by the processor, cause the system to perform operations comprising:
   aggregating page information of image-page tuples of an image cluster into aggregated page information;
   identifying descriptive terms from the aggregated page information to represent the image cluster; and annotating selected image-page tuples of the image cluster with the descriptive terms to produce annotated image-page tuples utilized in subsequent searches processed by a search system.

2. The system of claim 1, wherein the operations further comprise indexing the selected image-page tuples annotated with one or more of the descriptive terms.

3. The system of claim 1, wherein the operations further comprise training a model that is employed to assign weights to the descriptive terms associated with the aggregated page information.

4. The system of claim 1, wherein the model is a statistical model configured to assign different weights to descriptive terms obtained from different locations of a page.

5. The system of claim 1, further comprising resolving term duplication weighting and cross-cluster term weighting.

6. The system of claim 1, wherein identifying the descriptive terms comprises selecting top weighted descriptive terms of the aggregated page information as the descriptive terms.

7. The system of claim 1, wherein identifying the descriptive terms comprises selecting a set of terms having highest scores.

8. The system of claim 1, wherein identifying the descriptive terms comprises ranking the descriptive terms into a ranked list of descriptive terms.

9. The system of claim 1, wherein the operations further comprise computing an optimum system operating state that is a compromise between system performance and ranking relevance performance, the optimum system operating state obtained by selection of an optimum operating set of the descriptive terms.

10. A method, comprising acts of:
aggregating all page information of image-page tuples of an image cluster into aggregated page information;
identifying descriptive terms from the aggregated page information to represent the image cluster; and
annotating selected image-page tuples of the image cluster with the descriptive terms to produce annotated image-page tuples utilized in subsequent searches processed by a search system.

11. The method of claim 10, further comprising indexing the selected image-page tuples.

12. The method of claim 10, further comprising training a model that is employed to assign weights to the descriptive terms of a page.

13. The method of claim 10, wherein identifying descriptive terms from the aggregated page information comprises selecting top weighted descriptive terms of the aggregated page information as the descriptive terms.

14. The method of claim 10, wherein identifying descriptive terms from the aggregated page information comprises selecting an optimum set of the descriptive terms based on system performance tradeoffs.

15. The method of claim 10, wherein identifying descriptive terms from the aggregated page information comprises selecting a set of terms having highest scores using a feature selection algorithm.

16. The method of claim 10, wherein identifying descriptive terms from the aggregated page information comprises ranking the descriptive terms into a ranked list of descriptive terms.

17. The method of claim 10, further comprising resolving term duplication and cross-cluster term weighting issues.

18. A non-transitory computer-readable storage medium comprising computer-executable instructions that when executed by a hardware processor, cause the hardware processor to perform acts of:
aggregating all page information image-page tuples of an image cluster into aggregated page information;
identifying descriptive terms from the aggregated page information to represent the image cluster;
annotating selected image-page tuples of the image cluster with the descriptive terms; and
indexing the selected image-page tuples based on the descriptive terms to facilitate a search performed on the index of annotated image-pair tuples.

19. The non-transitory computer-readable storage medium of claim 18, further comprising training a statistical model that assigns different term weights based on location of the descriptive terms in a page.

20. The non-transitory computer-readable storage medium of claim 18, wherein identifying descriptive terms from the aggregated page information comprises selecting a set of descriptive terms comprising at least one of:
selecting top weighted descriptive terms of the aggregated page information as the descriptive terms;
selecting an optimum set from the top weighted descriptive terms based on system performance tradeoffs;
computing an optimum system operating state based on derivation of an optimum set of the descriptive terms; and
ranking the descriptive terms into a ranked list of descriptive terms.

* * * * *